United States Patent [19]

Wakami et al.

[11] 4,104,684

[45] Aug. 1, 1978

[54] ROTARY HEAD TYPE MAGNETIC VIDEO RECORDING AND REPRODUCING SYSTEM

[75] Inventors: Noboru Wakami, Hirakata; Masahiro Deguchi, Yao, both of Japan

[73] Assignee: Matsushita Electric Industrial Co., Ltd., Osaka, Japan

[21] Appl. No.: 686,396

[22] Filed: May 14, 1976

[30] Foreign Application Priority Data

| May 19, 1975 | [JP] | Japan | 50/60386 |
| May 19, 1975 | [JP] | Japan | 50/60387 |
| May 19, 1975 | [JP] | Japan | 50/60388 |
| Jul. 14, 1975 | [JP] | Japan | 50/86505 |
| Aug. 27, 1975 | [JP] | Japan | 50/104380 |
| Nov. 12, 1975 | [JP] | Japan | 50/136502 |
| Nov. 12, 1975 | [JP] | Japan | 50/136503 |

[51] Int. Cl.² .............. G11B 15/46; G11B 15/26
[52] U.S. Cl. ............................ 360/70; 360/77; 360/73; 318/576
[58] Field of Search ............. 360/77, 75, 70, 73; 318/576

[56] References Cited

U.S. PATENT DOCUMENTS

| 3,196,421 | 7/1965 | Grace | 360/73 |
| 3,582,541 | 6/1971 | Hebb | 360/70 |
| 3,596,007 | 7/1971 | Price | 360/73 |
| 3,663,764 | 5/1972 | Trost | 360/70 |
| 3,742,200 | 6/1973 | Marley | 318/576 |

*Primary Examiner*—Bernard Konick
*Assistant Examiner*—Alan Faber
*Attorney, Agent, or Firm*—Stevens, Davis, Miller & Mosher

[57] ABSTRACT

A recorded signal reproducing system includes a signal generator circuit which produces a tracking control signal in response to an output from a detection circuit which detects that a difference between an output of a peak hold circuit which holds a maximum amplitude of an envelope of a reproduced signal from a rotary head for a relatively long period and an output of an envelope detection circuit exceeds a predetermined threshold. The tracking control signal is used to control the relative positional relationship between the rotary head and a magnetic tape for controlling tracking during the playback operation.

17 Claims, 30 Drawing Figures

RELATIVE POSITION OF
HEAD AND TAPE

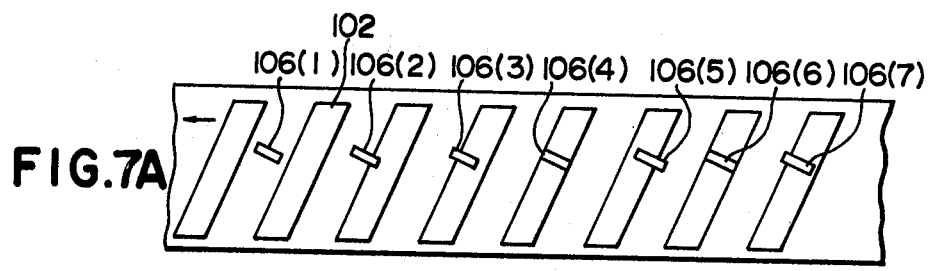
FIG.7A
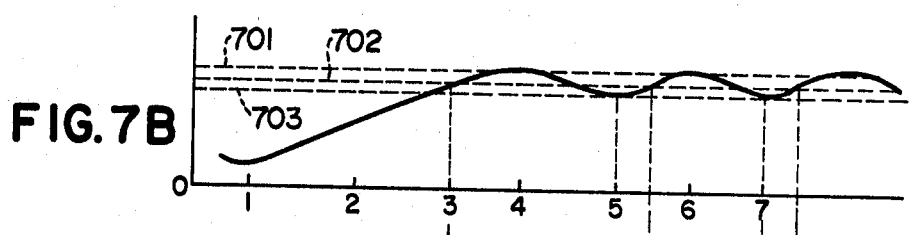
FIG.7B
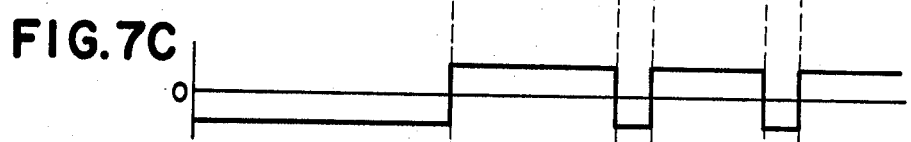
FIG.7C
FIG.7D
FIG.7E
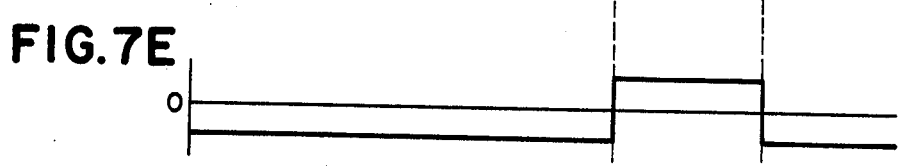
FIG.7F
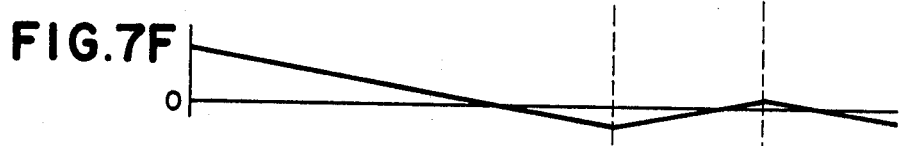
FIG.7G
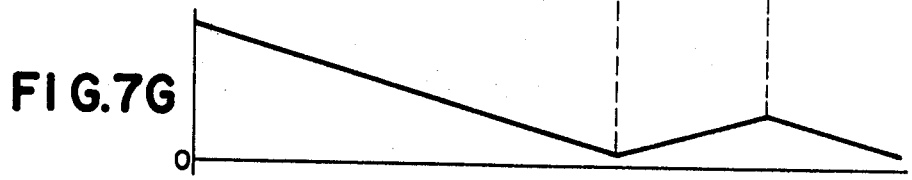

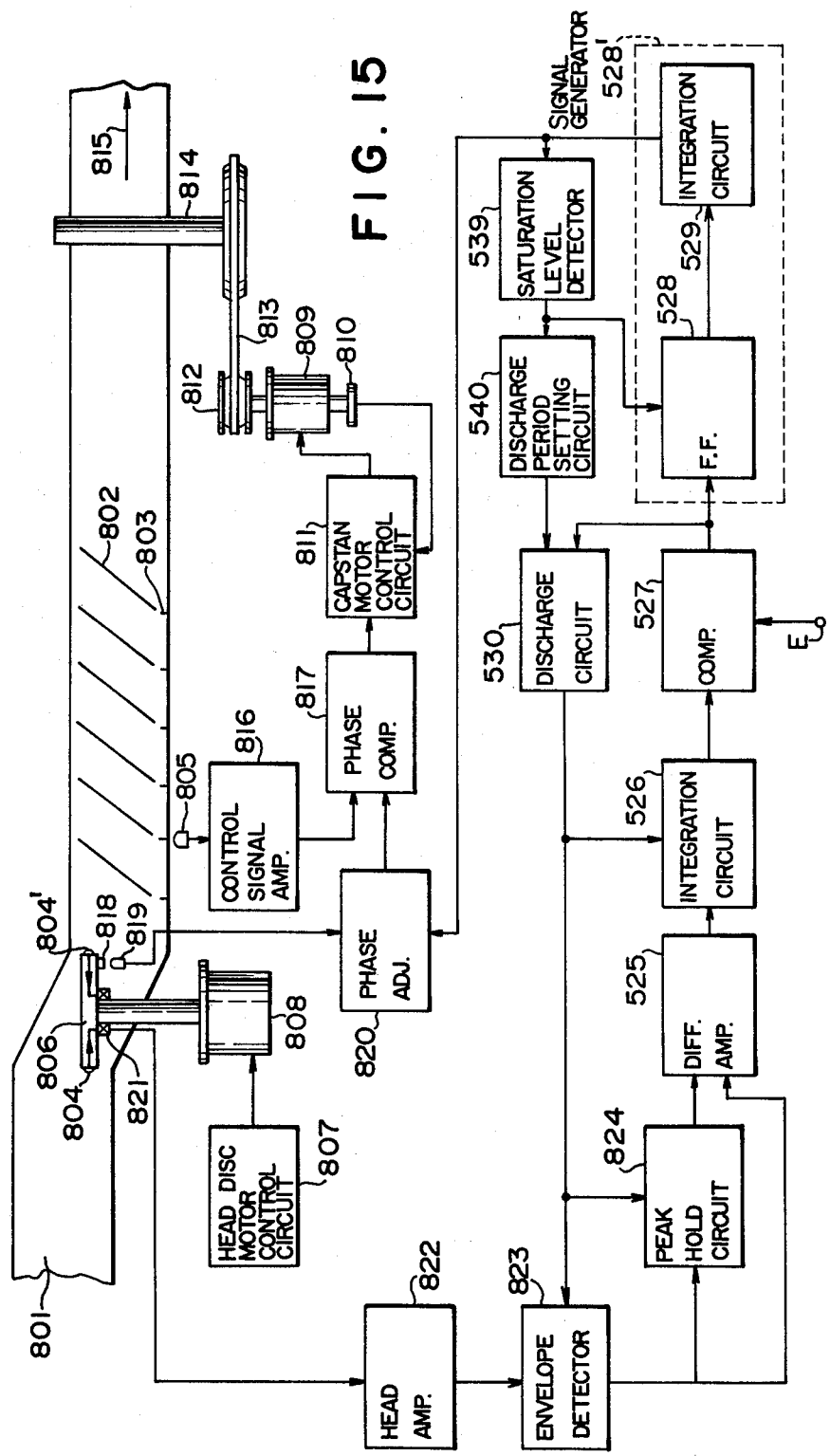

ROTARY HEAD TYPE MAGNETIC VIDEO RECORDING AND REPRODUCING SYSTEM

The present invention relates to a rotary head recorded signal reproducing system wherein signals are recorded on and reproduced from record tracks which are oblique to a longitudinal direction of a tape recording medium, by a rotary head, and more particularly to a rotary head magnetic video recording and reproducing system.

In a rotary head magnetic recording and reproducing system (hereinafter referred to as VTR), it is required that in a playback operation a rotary head accurately traces signal tracks recorded during a recording operation. To this end, heretofore, during the recording operation, signals related to vertical synchronizing signals for a video signal (signals related to vertical synchronizing signals for a television signal to e recorded) have been recorded as a control signal in the longitudinal direction of a tape, and during the playback operation a relative position of the rotary head and the tape was controlled with reference to the control signal to attain a tracking control for insuring that the rotary head traced the same track as that defined during the recording operation. The adjustment for an optimum tracking condition in which the rotary head accurately traces the record track most accurately was attained by adjusting the phase of the reproduced control signal. This adjustment was achieved by controlling the phase of a tracking shifter incorporating a monostable multivibrator by manual adjustment of a variable resistor in order to obtain a maximum S/N ratio of a reproduced image on a television screen. However, this adjustment method included a drawback in that less experienced operators could not readily set the system at an optimum condition. For this reason, there has been a recent trend toward providing a presetting of the tracking shifter so that a substantially optimum tracking can be attained at the preset value among the same type of VTR's. However, this presetting system produces a substantial error due to variation in tape tension, tape expansion and shrinkage with temperature change, variation in relative position of a video track to a control head, and variation in a level of mounting of the rotary head, and it has been difficult to restrict those variations within, predetermined ranges among various types of systems.

It is an object of the present invention to provide a recorded signal reproducing system in which the reproduction of recorded signal can be carried out at an optimum tracking condition automatically set with a simple and inexpensive arrangement.

The above object can be attained by a recorded signal reproducing system of the present invention, which comprises a peak hold circuit for holding, for a relatively long period, a maximum amplitude of an envelope of a signal reproduced by a rotary head which scans along record tracks which are oblique to the longitudinal direction of a magnetic tape, an envelope detector circuit for said reproduced signal envelope, a detection circuit for detecting when a difference between an output of said peak hold circuit and an output of said envelope detection circuit exceeds a predetermined threshold, and a signal producing circuit for producing a tracking control signal in response to an output from said detection circuit, whereby a positional relationship between the rotary head and the magnetic tape is controlled to effect the tracking control during the playback operation.

The above and other objects, features and advantages of the invention will appear more fully from the following description taken in conjunction with the accompanying drawings, in which.

FIG. 7, consisting of 7A through 7G, illustrates the operation of the embodiment of the present invention.

Figure 8:
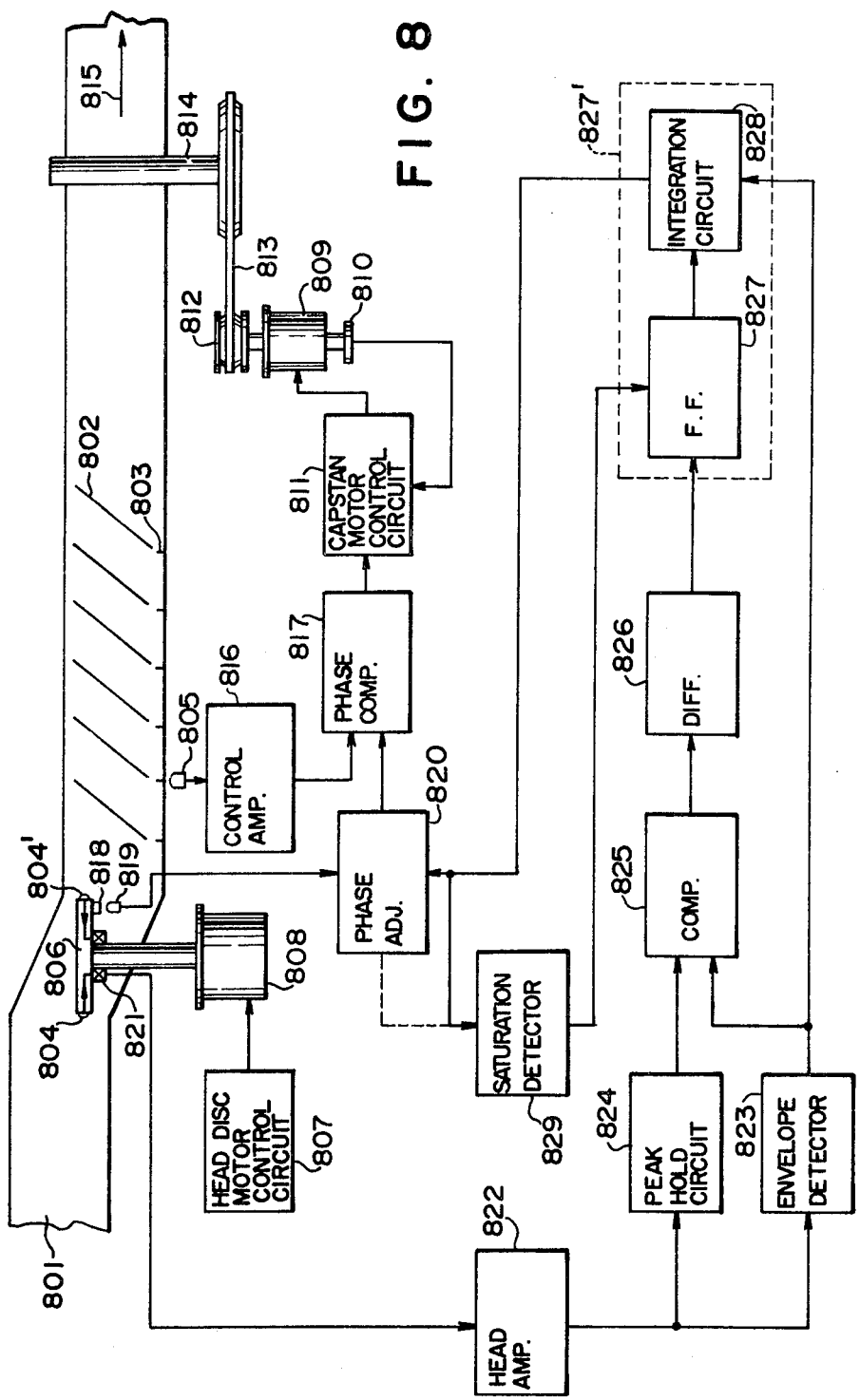
Figures 8A, 17:
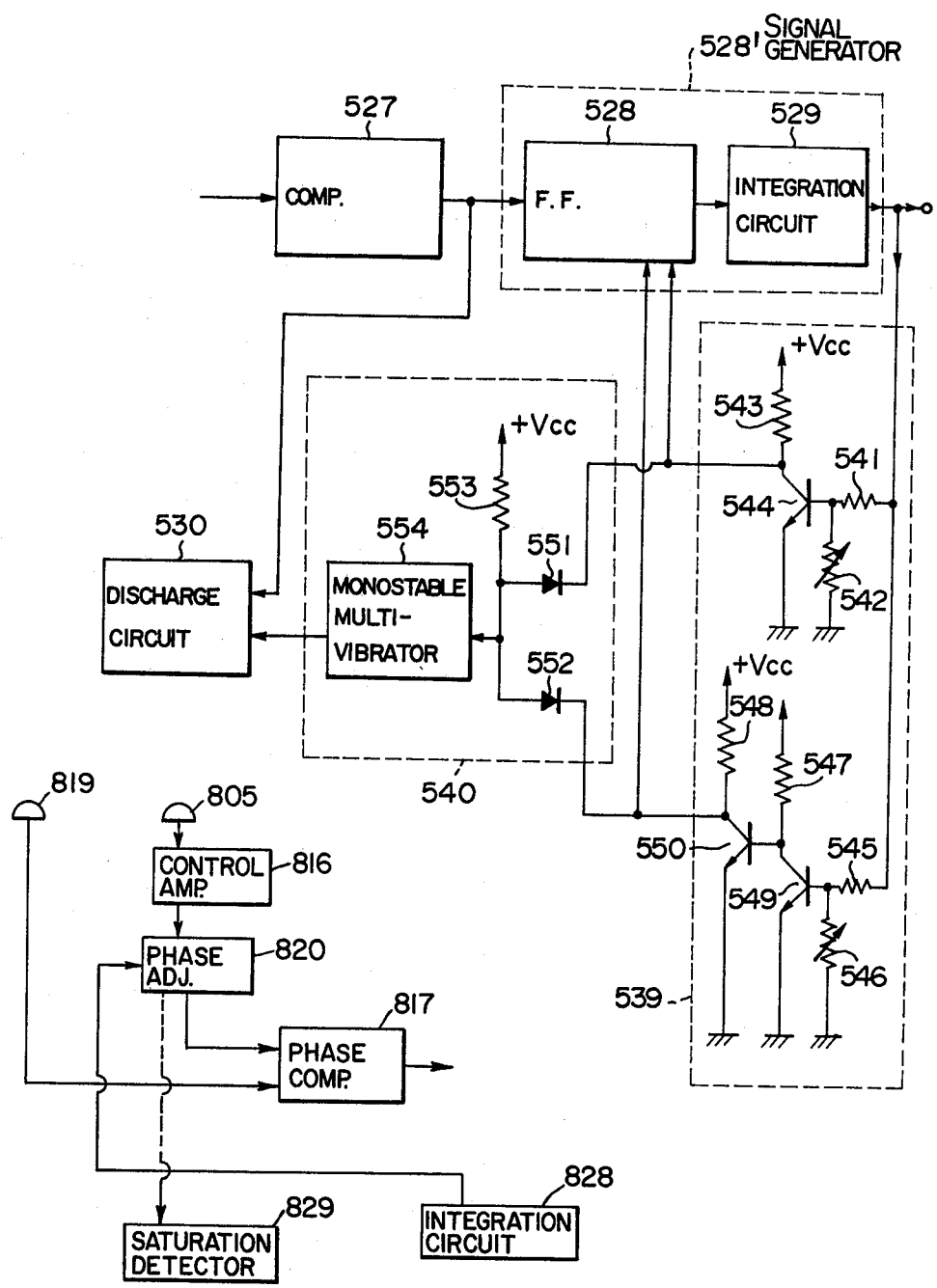

FIGS. 8 and 8A are electrical block diagrams illustrating another embodiment of the present invention.

FIG. 8A illustrates a modification of the embodiment of FIG. 8.

Figure 9:
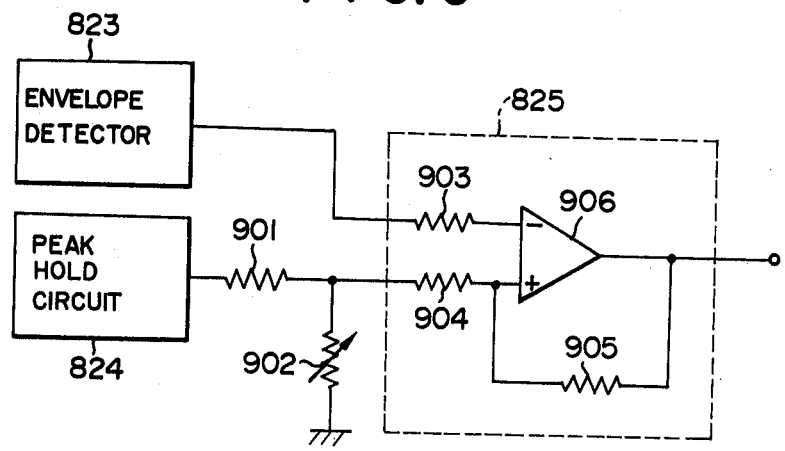

FIG. 9 shows a specific circuit diagram of a hysteresis comparator.

Figure 10:
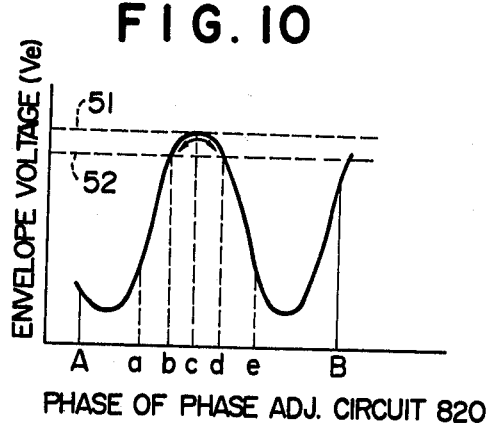
Figure 13:
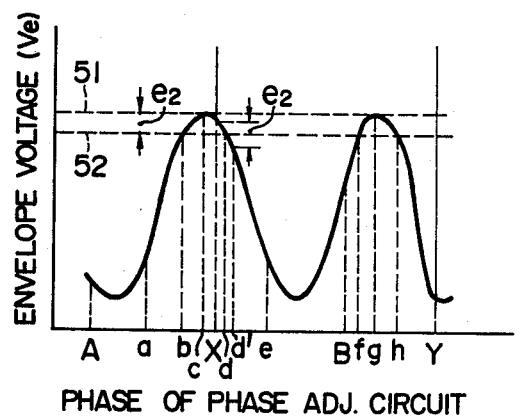

FIGS. 10 and 13 show relationships between a phase of a phase adjustment circuit and an envelope detection output voltage.

Figure 11:
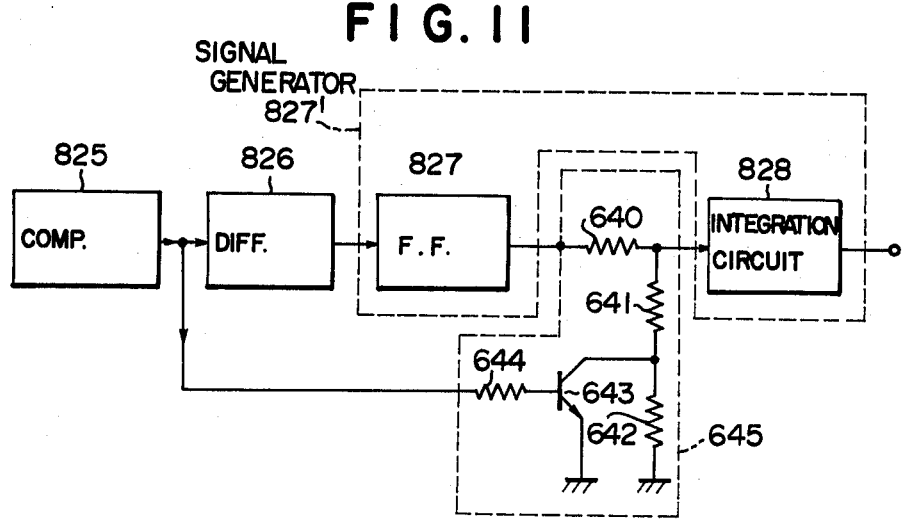
Figure 12:
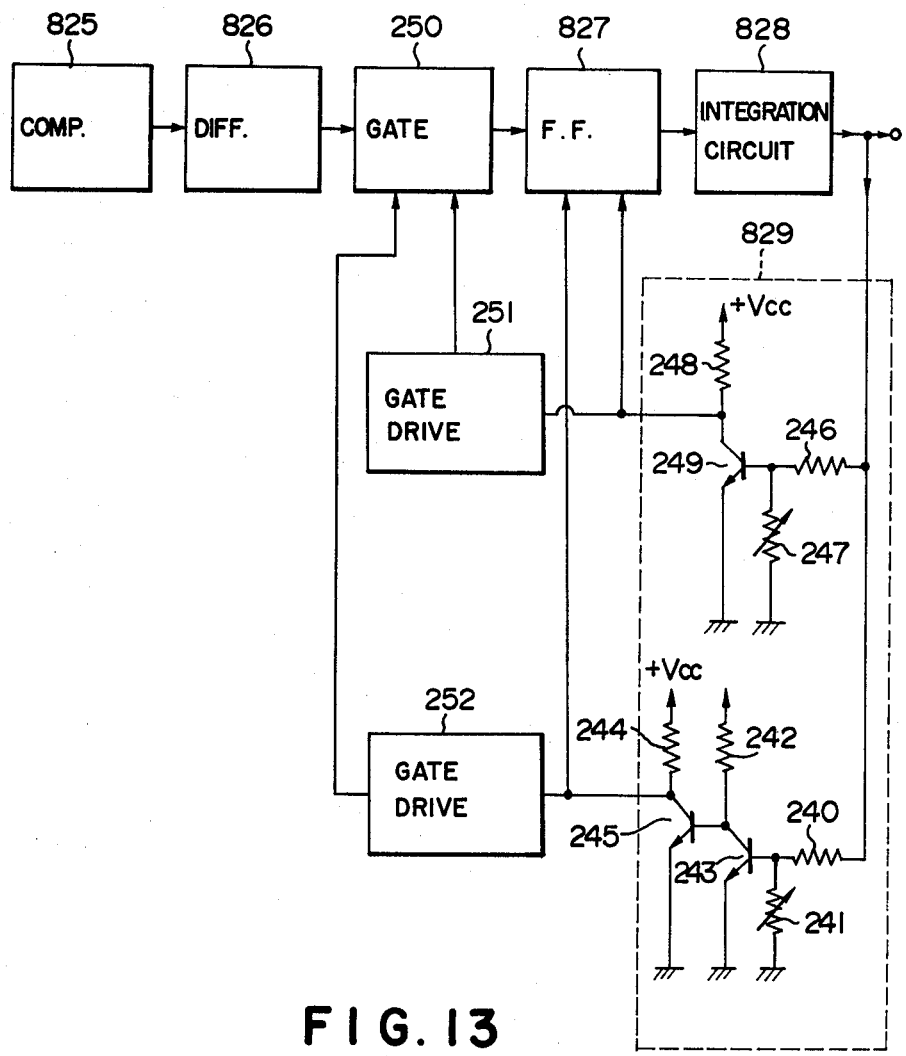

FIGS. 11 and 12 show specific circuit diagrams illustrating examples of main sections of the present invention.

Figure 14:
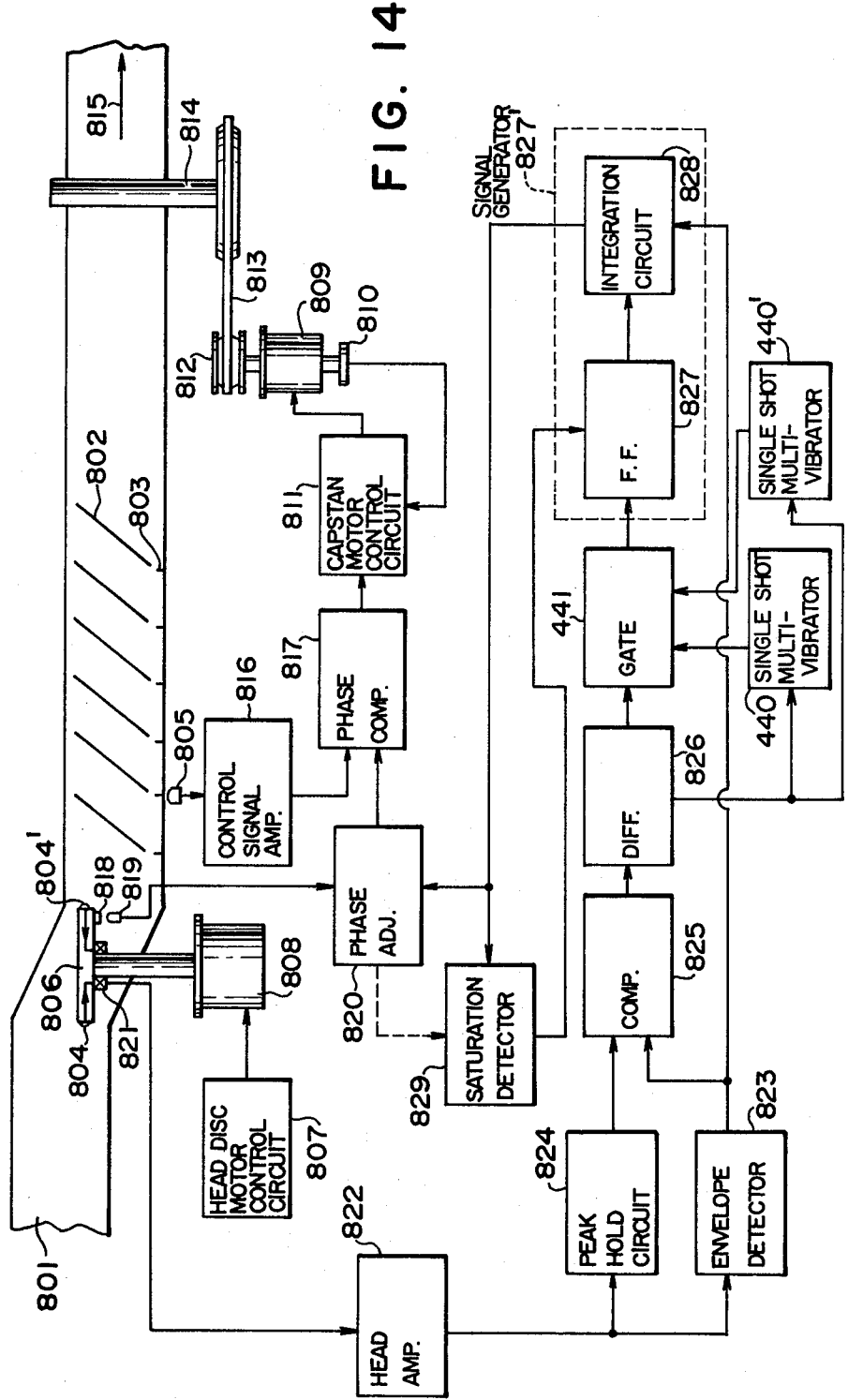
Figure 16A:
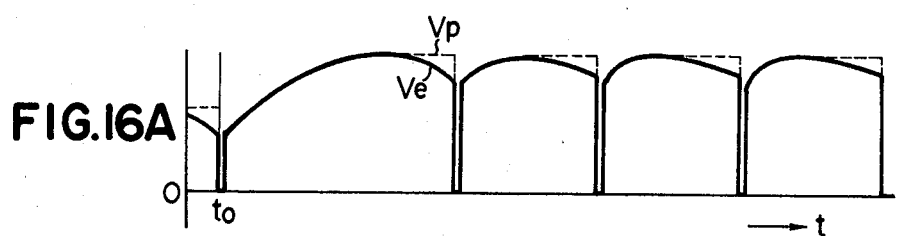
Figure 16B:
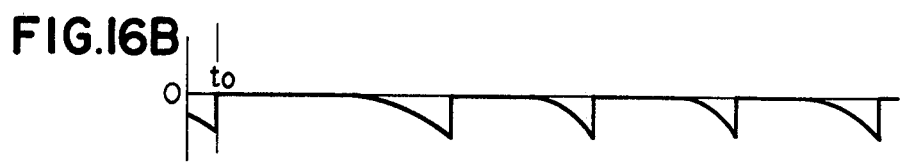
Figure 16C:
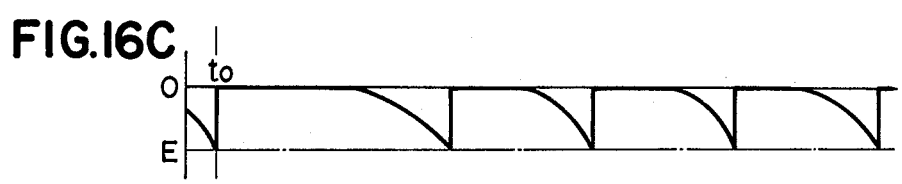
Figure 16D:
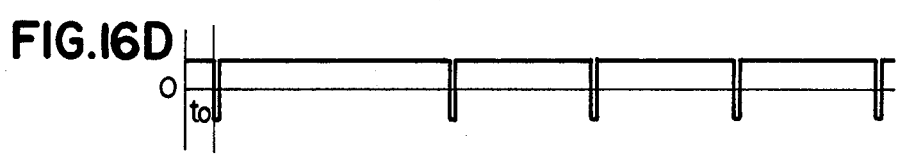
Figure 16E:
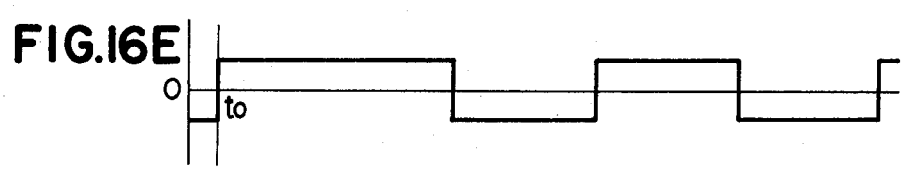
Figure 16F:
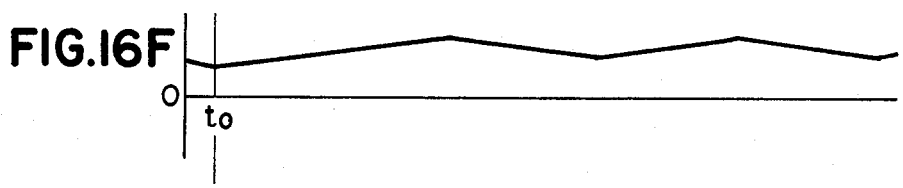

FIGS. 14 and 15 are electrical block diagrams illustrating other embodiments of the present invention.

FIG. 16, consisting of 16A through 16F, illustrates the operation of the other embodiment of the present invention.

FIG. 17 is a specific circuit diagram showing an example of a main section of the present invention.

Figure 18:
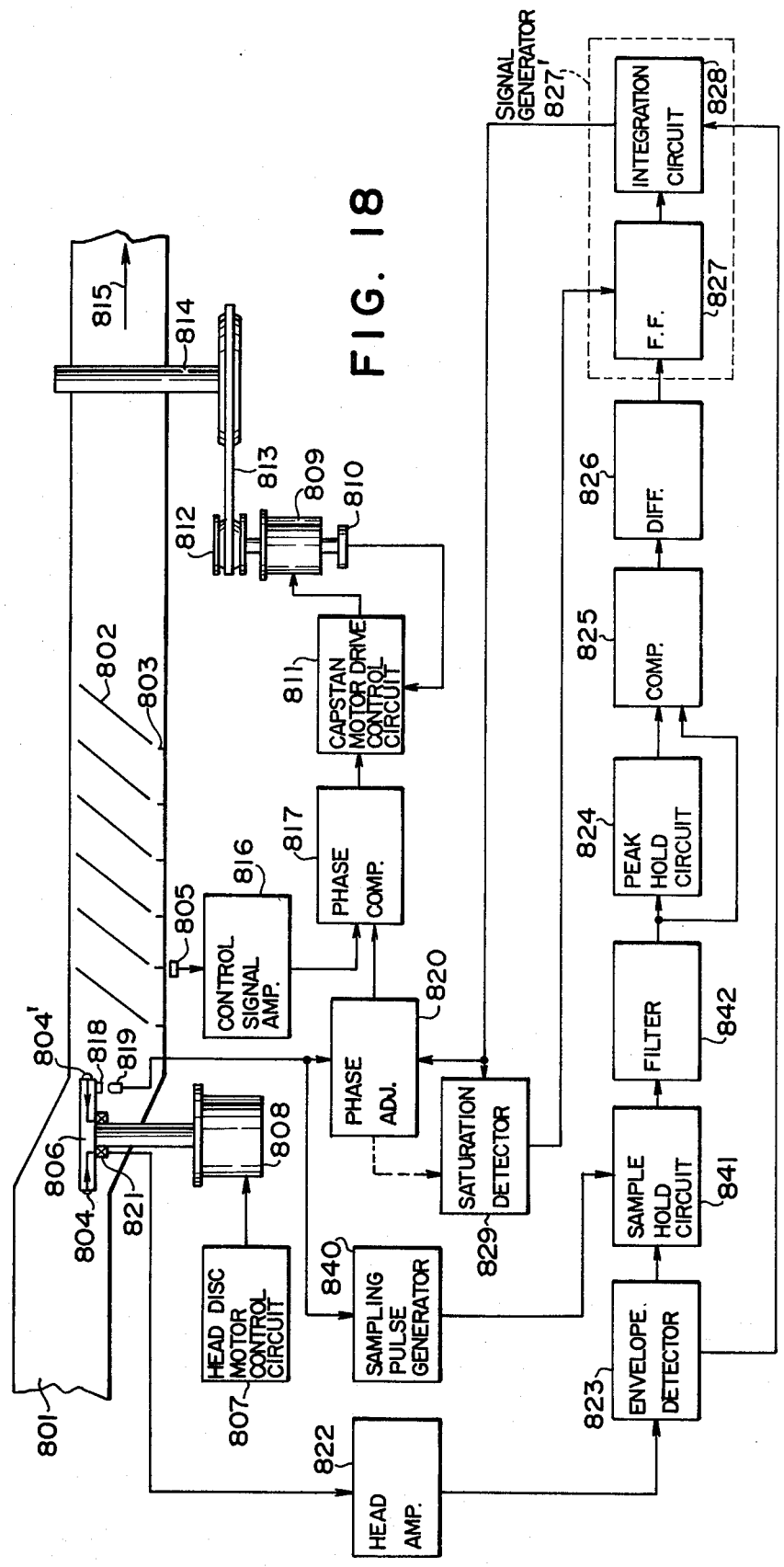

FIG. 18 is an electrical block diagram illustrating other embodiment of the present invention.

Figure 1:
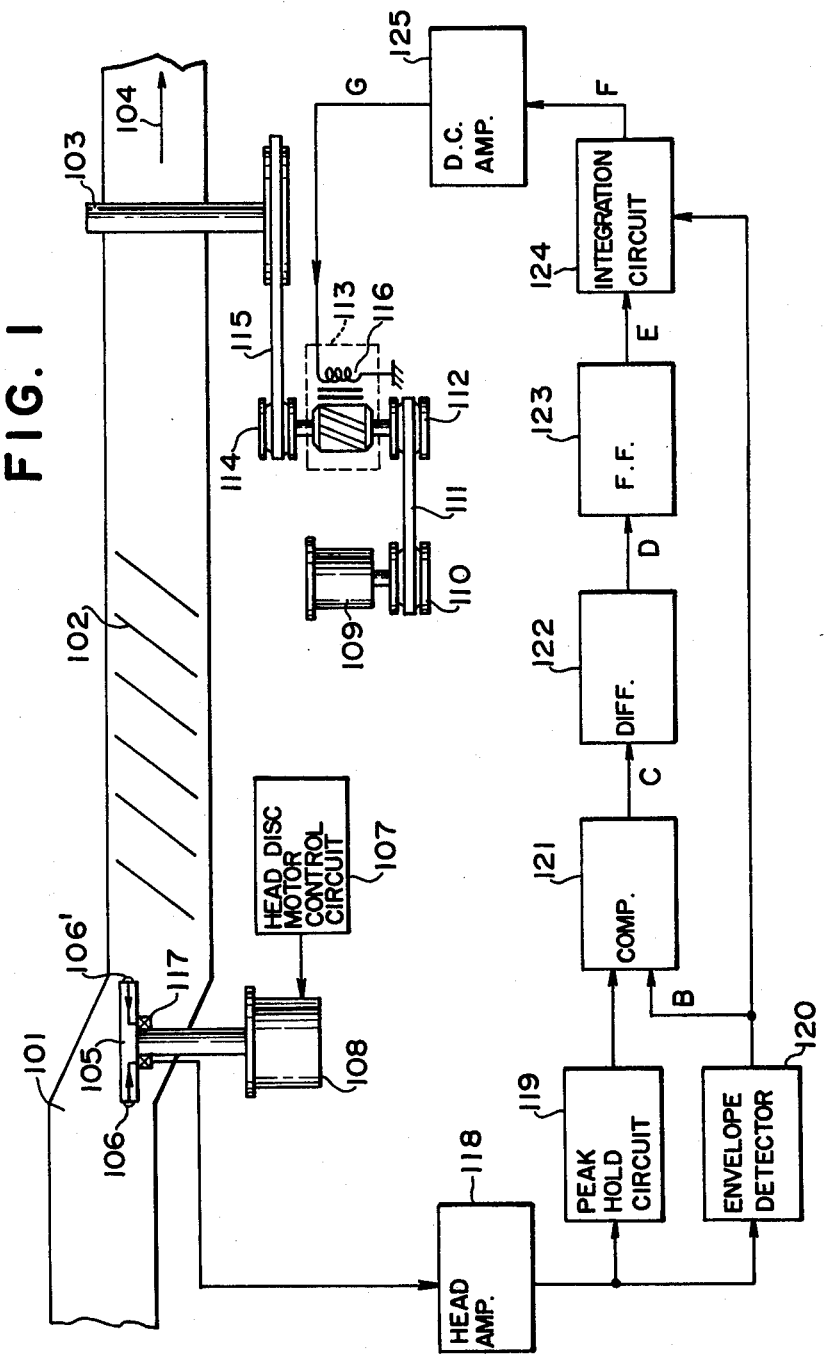
FIG. 1 is an electrical block diagram illustrating one embodiment of the present invention.

Referring now to FIG. 1, one embodiment of the present invention is shown.

Figure 3:
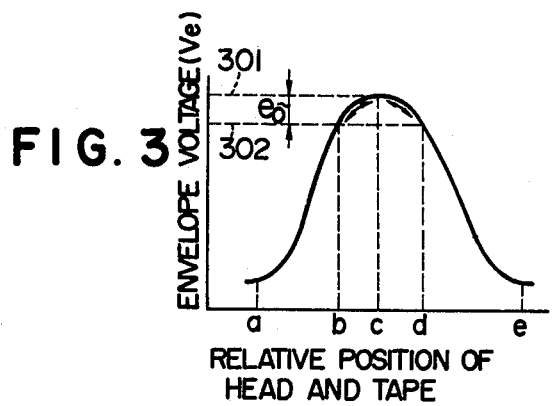
FIG. 3 shows a relation between a relative position of the scanning position of the rotary head and the record track shown in FIG. 2 and a reproduced output from the rotary head.
Figure 4:
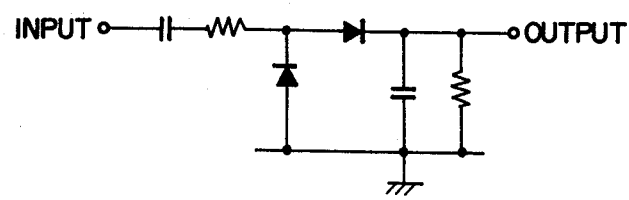
FIG. 4 is an electrical wiring diagram showing an example of a peak hold circuit.

In FIG. 1, a frequency modulated video information signal has been recorded on a magnetic tape 101 along oblique record tracks 102. The magnetic tape 101 is transported in the direction of an arrow 104 by a tape driving capstan 103 and a pinch roller (not shown). The recorded video information signal tracks 102 are reproduced by rotary heads 106 and 106' mounted on a head disc 105, which in turn is mounted to a head disc motor 108 controlled by a head disc motor control circuit 107 for constant rotating speed drive. The tape driving capstan 103 receives power via an electromagnetic brake 113 which is powered from a synchronous motor 109 driven by a commercial power supply through a pulley 110, a belt 111 and a pulley 112, and through a pulley 114 and a belt 115. The rotation speed of the capstan 103 is controlled by varying a brake force of the electromagnetic brake 113 by controlling a current through a brake coil 116 of the electromagnetic brake 113 so that the tape 101 is transported at a predetermined velocity. At the same time, tracking servo is effected so that the rotary magnetic heads 106 and 106' pass over the video information signal tracks 102 by adjusting the relative positional relationship between the rotary heads 106 and 106' and the magnetic tape 101. The video information signals reproduced by the rotary heads 106 and 106' are taken out by a rotating transformer 117 and amplified by a head amplifier 118. An output from the head amplifier 118 is applied to a peak hold circuit 119 and the envelope detection circuit 120, an output of which changes in a manner shown in FIG. 3 depending on relative positional relations $a - e$ between the rotary head 106 and the video information signal record track 102 shown in FIG. 2. The reference characters $a - e$ in FIG. 3 indicate the corresponding positions in FIG. 2. The peak hold circuit 119 sequentially detects and holds a maximum amplitude of an envelope of the output from the head amplifier 118, and it finally holds the output of the head amplifier 118 when the rotary head 106 is in the state $c$ in FIG. 2, that is, the envelope voltage at the position $c$ in FIG. 2 (the voltage shown by a broken line 301 in FIG. 3). The peak hold circuit 119 should have a large discharging time constant to compare with a discharging time constant of the envelope detection circuit 120 and be capable of holding the maximum amplitude of the envelope for a relatively long period. It may include decrease of holding voltage due to discharge and it may be a conventional envelope detection circuit with a properly short charging time constant and a properly long discharging time constant to compare with the charging time constant, as shown in FIG. 4.

Figure 2:
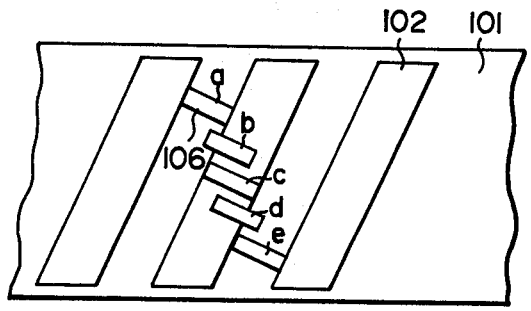
FIG. 2 shows a relative positional relationship between a scanning position of a rotary head and a record track.
Figure 5:
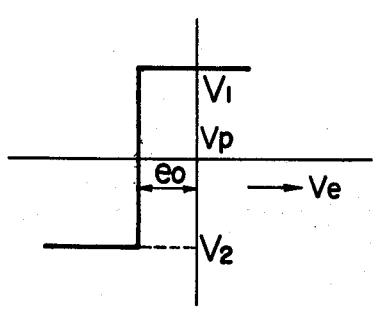
FIGS. 5 and 6 show characteristics of a comparator.

Outputs from the peak hold circuit 120 and the envelope detection circuit 120 are applied to a comparator 121, which, as shown in FIG. 5, produces a positive voltage $V_1$ when $V_3 > V_p - e_o$ where $V_p$ is the output voltage of the peak hold circuit 119, $V_e$ is the output voltage of the envelope detection circuit 120 and $e_o$ is a threshold voltage, and produces a negative voltage $V_2$ when $V_3 \leq V_p - e_o$. That is, it determines whether the difference between the output voltage $V_p$ of the peak hold circuit 119 and the output voltage $V_e$ of the envelope detection circuit 120 is smaller than the predetermined threshold voltage $e_o (V_p - V_e < e_o)$ or not smaller than the predetermined threshold voltage $e_o (V_p - V_e \geq e_o)$ and produces the positive output voltage $V_1$ when the difference is smaller while it produces the negative voltage $V_2$ when the difference is not smaller. This circuit therefore determines whether the difference between $V_p$ and $V_e$ exceeds the threshold voltage $e_o$ or not. Referring to FIGS. 2 and 3, for example, when the relative position of the rotary head to the tape changes sequentially from the positions $a$ to $e$ in FIG. 2, the output of the envelope detection circuit 120 also changes sequentially from the state $a$ to $e$ in FIG. 3. Assuming that the peak hold circuit 119 holds the voltage shown by the broken line 301 in $c$ in FIG. 3 which corresponds to the positional relation of the rotary head and the magnetic tape shown by $c$ in FIG. 2 and that a voltage shown by a broken line 302 shows a voltage equal to the voltage shown by the broken lone 301 less the threshold voltage $e_o$, the output voltage of the comparator 121 is the negative voltage $V_2$ when the relative position of the rotary head is at $a$ and it changes to the positive voltage $V_1$ when the output voltage of the envelope detection circuit 120 exceeds the voltage of the broken line 302. Thereafter it is maintained at the positive voltage $V_1$, and when the rotary head position changes through the relative position $c$ with the decrease of the output voltage of the envelope detection circuit 120, to the relative position $d$ with the output voltage of the envelope detection circuit 120 being equal to the voltage shown by the broken line 302, the output of the comparator 121 again changes to the negative voltage $V_2$ and thereafter it is maintained at the negative voltage $V_2$. Similar explanation is applicable when the relative positional relation of the rotary head and the magnetic tape changes sequentially from $e$ to $a$. In accordance with the present invention, tracking control is effected by utilizing the fact that when the relative positional relation of the rotary head and the magnetic tape changes from $c$ to $d$, that is, when the difference between the output voltage $V_p$ of the peak hold circuit 119 and the output voltage $V_e$ of the envelope detection circuit 120 increases to exceed the threshold voltage $e_o$, the output voltage of the comparator 121 changes from the positive voltage $V_1$ to the negative voltage $V_2$.

Figure 6:
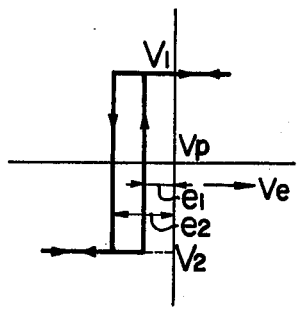

In order to prevent an influence to the control system due to an unstable output voltage variation by an input voltage around the threshold voltage at which the inversion of the output of the comparator takes place, the comparator 121 preferably has a hysteresis characteristic as shown in FIG. 6. This unwanted influence can occur as a result of a variation of the envelope voltage of the reproduced signal while the rotary head 106 scans a record track 102, a variation of the envelope voltage due to a variation in the characteristics of the rotary heads 106 and 106', and a variation due to an abrupt change of the envelope voltage as a result of noise or the like. With the characteristic of FIG. 6, when $V_e$ increases so that the difference between $V_p$ and $V_e$ falls below $e_1$, the output of the comparator changes to the positive voltage $V_1$. Sinces since it is required that $V_e$ decreases so that the difference between $V_p$ and $V_e$ exceeds the voltage $e_2$ in order for the output of the comparator to again change to the negative voltage $V_2$, no unstable operation of the comparator occurs for ripples of the envelope voltage or noise which are below $e_2 - e_1$. Therefore, an improved comparator output characteristic is attained. The voltage $e_2$ corresponds to the threshold voltage $e_o$ of FIG. 5 when the comparator having the hysteresis characteristic is used.

The output of the comparator 121 is applied to a differentiating circuit 122, which produces positive and negative pulses for each inversion of the output of the comparator 121. The output pulses of the differentiating circuit 122 are applied to a flip-flop circuit 123, which in turn is triggered by the negative pulse of the differentiating circuit 122 and repeats the inversion operation between a positive voltage level and a negative voltage level. The output of the flip-flop 123 is integrated by an integration circuit 124, which in turn produces a ramp output the polarity of which is inverted for each inversion of the output voltage of the flip-flop 123. The output voltage of the integration circuit 124 is power amplified by a current amplifier circuit 125 the output of which is supplied to a brake coil 116 of the electromagnetic brake 113 which transmits the power of the synchronous motor 109 to the capstan 103 and at the same time controls the rotation of the capstan. In this manner the rotation of the capstan 103 is controlled to control the transport of the magnetic tape 101 for adjusting the relative positional relation between the rotary heads 106 and 106' and the magnetic tape 101 or the video information signal record track 102 in order to effect the tracking control whereby the rotary heads 106 and 106' pass over the video information signal record track 102.

The operation of the circuit of FIG. 1 is now explained with reference to waveforms shown in FIGS. 7A through 7G. FIG. 7A shows positional relation of the rotary head 106 and the record track 102, and FIGS.

7B, 7C, 7D, 7E, 7F and 7G show output waveforms of the envelope detection circuit 120, the comparator 121 with the hysteresis characteristic, the differentiating circuit 122, the flip-flops 123, the integration circuit 124 and the current amplifier circuit 125, respectively. When the rotary head 106 is scanning the position 106(1), the output of the envelope detection circuit 120 (FIG. 7B) is at a minimum level, and the output of the flip-flop 123 (FIG. 7G) is at the negative voltage level so that the output of the integration circuit 124 and hence the output voltage of the current amplifier 125 are decreasing. As a result, the brake force of the electromagnetic brake 113 decreases and the rotation speed of the capstan 103 increases resulting in the increase of the tape velocity. Consequently, the rotary head 106 assumes the position 106 (2) and then the position 106(3). As the rotary head 106 scans the position 106(3), the difference between the voltage shown by the broken line 701 which is a hold voltage of the peak hold circuit 119 and the output voltage of the envelope detection circuit 120 becomes equal to the voltage level shown by a broken line 702 which is an inversion level for the comparator 121, and the comparator 121 changes its output to the positive voltage. At this time, however, the flip-flop 123 is not inverted because the output of the differentiating circuit is a positive pulse. When the rotary head 106 scans past the position 106(4) and then scans the position 106(5) with the output of the envelope detection circuit 120 starting to decrease from the maximum level, the voltage difference between the hold voltage of the peak hold circuit 119 and the output voltage of the envelope detection circuit 120 exceeds the threshold voltage shown by a broken line 703 which is the inversion level for the comparator 121 when the voltage difference increases, and hence the output of the comparator 121 changes from positive to negative voltage. In response thereto, the differentiating circuit 122 produces a negative pulse to trigger the flip-flop 123, which in turn produces a positive voltage so that the output of the integration circuit 124 changes in the increasing direction. Consequently, the brake force of the electromagnetic brake 113 increases and the tape velocity decreases so that the output of the envelope detection circuit 120 again starts to increase. Thereafter, when the rotary head 106 moves past the position 106(6) to scan the position 106(7), the flip-flop 123 agains changes to the negative level and the tape velocity again starts to increase. In this manner, the relative position of the rotary head 106 to the record track 102 is controlled such that the output voltage of the envelope detection circuit 120 varies within the range between the broken lines 701 and 703.

In FIG. 1, the output of the envelope detection circuit 120 is applied to the integration circuit 124. This serves to control an integration time constant of the integration circuit 124 in accordance with the voltage level of the envelope detection circuit 120. That is, when the output level of the envelope detection circuit 120 is low, the integration time constant is set to be short and as the output level goes higher the integration time constant is set to be longer. In this manner, the capstan speed can be rapidly changed when the rotary head is at a bad scanning position in order to shorten the time required for the rotary head to reach a proper scanning position, and as the rotary head approaches the proper scanning position the rate of change of the capstan speed is lowered so that the rising time of the tracking control is shortened and the rate of change of the tape speed after stabilization is lowered to lower the frequency of wow-flutter resulting from the control and at the same time minimize the increase of wow-flatter.

In the embodiment of FIG. 1, the tape driving capstan 103 is normally driven at a velocity which is faster than a nominal velocity of several percent thereof and the velocity of the capstan is reduced by the brake force of the electromagnetic brake 113. Alternatively, the capstan 103 may be driven directly by the capstan motor or indirectly through a belt or the like and the rotation speed of the capstan motor may be controlled in accordance with the output of the integration circuit 124. Furthermore, while the present embodiment controls the tape drive system in order to control the relative positional relation of the rotary heads 106 and 106' and the video signal record track 102, the rotary head system may be controlled in accordance with the output of the integration circuit 124 while the tape drive system is driven at a constant velocity by the capstan.

Another embodiment of the present invention is shown in FIG. 8.

In FIG. 8, a magnetic tape 801 has a video information signal 802 and a control track signal 803, which has been heretofore used as a tracking servo signal, recorded thereon, and those signals are reproduced by rotary heads 804 and 804' and a stationary control head 805, respectively. The rotary heads 804 and 804' are mounted on a head disc 806 which is rotated at a predetermined rotation speed by a head motor 808, which in turn is driven by a head motor drive control circuit 807. On the other hand, the magnetic tape 801 is driven in the direction of an arrow 815, through a pulley 812 and a belt 813, by a capstan motor 809 which includes a frequency generator 810 for generating a frequency signal proportional to the rotation speed of the capstan motor and is driven by a capstan motor drive control circuit 811 to which the signal from the frequency generator is applied. The control signal reproduced by the control head 805 and amplified by a control signal amplifier circuit 816 is applied to a phase comparator circuit 817. Applied to the other input of the phase comparator circuit 817 is a rotation phase signal for the rotary heads 804 and 804', which is produced by sensing a magnet segment 818 attached to the head disc 806 by the stationary magnetic head 819 and phase adjusted by a phase adjusting circuit 820. An error signal from the phase comparator circuit 817 is applied to the capstan motor drive control circuit 811 to fine adjust the capstan motor 809 which has been driven near a predetermined speed by the capstan motor drive control circuit 811 for keeping the rotation phase of the rotary heads 804 and 804' and the reproduction phase of the control signal 803 in a phase relationship determined by the phase adjustment circuit 820. As a result, the rotary heads 804 and 804' scan over a predetermined relative position on the record track 802 determined by the phase adjustment circuit 820. On the other hand, the video information signals reproduced by the rotary heads 804 and 804' are taken out by a rotating transformer 821 and amplified by a head amplifier 822 and envelope detected by an envelope detection circuit 823. The output signal of the envelope detection circuit 823 has a relationship as shown in FIG. 10 with respect to the phase of the phase adjusting circuit 820. The output of the head amplifier 822 is also applied to a peak hold circuit 824 which is similar in construction to that described in the embodiment of FIG. 1 and holds a maximum amplitude of the envelope for a relatively long period. It may include the decrease of hold voltage by the discharge and it may be a conventional envelope detection circuit as shown in FIG. 4 with a charging time constant being set to be properly short and a discharging time constant being properly set to be long compared to the charging time constant. The output of the peak hold circuit 824 and the output of the envelope detection circuit 823 are applied to a comparator 825, which has a hysteresis characteristic as shown in FIG. 6. A specific circuit thereof is shown in FIG. 9 which comprises a resistor 903, a resistor 905 for applying a positive feedback signal to an non-inverting input terminal and an operational amplifier 906. The input to the comparator 825 is applied by dividing the hold voltage $V_p$ of the peak hold circuit 824 by resistors 901 and 902 and applying the divided voltage to the non-inverting input terminal of the operational amplifier 906 through the resistor 904. On the other hand, the envelope voltage $V_e$ of the envelope detection circuit 823 is applied to an inverting input terminal of the operational amplifier 906 through the resistor 903. The resistors 901 and 902 are adjusted such that the difference between the hold voltage $V_p$ and the envelope voltage $V_e$ becomes equal to the voltage difference $e_1$ shown in FIG. 6. The operation of the comparator with a hysteresis characteristic is now explained in conjunction with FIG. 6. If the difference between $V_p$ and $V_e$ is initially large and thereafter the difference falls below $e_1$ as $V_e$ increases, the output of the comparator charges to the positive voltage $V_1$. Since it is required that $V_e$ decreases such that the difference between $V_p$ and $V_e$ exceeds $e_2$ in order for the comparator output to be changed back to the negative voltage $V_2$, the comparator does not produce unstable output voltage variation for the envelope voltage variation below $e_2 - e_1$ and hence the comparator output characteristic can be improved. The voltage $e_2$ corresponds to the threshold voltage $e_o$ in FIG. 5 when the comparator having the hysteresis characteristic is used. By the use of the comparator 825 with the hysteresis characteristic, the influence by variation due to ripple and noise of the envelope voltage less than $e_2 - e_1$ can be eliminated.

The output of the comparator 825 is applied to a differentiating circuit 826 which produces positive and negative pulses for each inversion of the output of the comparator 825. A flip-flop 827 is triggered only by the negative pulse from the differentiating circuit 826 and the output thereof changes between positive and negative voltage levels. The output of the flip-flop 827 is applied to an integration circuit 828 where it is integrated and converter to increasing or decreasing signal depending on the polarity of the output voltage of the flip-flop 827 for controlling the phase of the phase adjusting circuit 820. When the phase of the phase adjusting circuit 820 is in the state $a$ of FIG. 10, the output voltage of the flip-flop 827 is at the positive voltage level, and the output of the integration circuit 828 is increasing, then the phase of the phase adjusting circuit 820 is in the direction of increase and it changes toward $b$ and $c$. In accordance therewith, the output of the envelope detection circuit 823 gradually increases, passes the maximum amplitude of the envelope shown by a broken line 51 and then changes in decreasing direction. When the phase of the phase adjusting circuit is in the state $d$, the difference between the envelope voltage $V_2$ of the envelope detection circuit 823 and the hold voltage $V_p$ of the peak hold circuit 824 (the maximum envelope voltage shown by broken line 51 in FIG. 10) becomes equal to the threshold voltage $e_2$ (shown by broken line 52 in FIG. 10) determined by the characteristic curve of FIG. 6 for the comparator 825. Accordingly, the output of the comparator 825 changes from the positive level to the negative level and the differentiating circuit 826 produces the negative pulse which causes the flip-flop 827 to change to the negative voltage level. As a result, the output of the integration circuit 828 starts to decrease and the phase of the phase adjusting circuit 820 again decreases toward the state $c$. In this manner, the phase of the phase adjusting circuit 820 is controlled to varys between the states $b$ and $d$ so that the output voltage of the envelope detection circuit 823 varies between the voltages shown by the broken lines 51 and 52. Thus, by properly setting the threshold voltage $e_2$, a satisfactory tracking can be maintained. Similar explanation is applicable when the phase of the phase adjusting circuit 820 changes from the state $e$ in the decreasing direction. In FIG. 8, the output of the envelope detection circuit 823 is applied to the integration circuit 828. This serves to change an integration time constant of the integration circuit 828 in accordance with the envelope voltage. That is, when the envelope voltage is high the integration time constant is lengthened and when the envelope voltage is low the integration time constant is shortened so that a time required to obtain an optimum tracking condition is reduced and once the optimum tracking condition is reached the rate of change of phase of the phase adjusting circuit is decreased in order to prevent the increase of wow-flutter and reduce the rate of change to minimize the influence to the quality of reproduced image. To this end, a gradient of an output signal of a signal generating circuit 827' comprising the flip-flop 827 and the integration circuit 828 is changed in accordance with the envelope voltage. A specific circuit configuration thereof is shown in FIG. 11 as a gradient modification circuit 645.

In the embodiment of FIG. 11, in order to reduce the gradient of the output signal of the signal generating circuit 827' when the envelope voltage is high and increase the gradient of the output signal of the signal generating circuit 827' when the envelope voltage is low, a voltage division ratio for the output voltage of the flip-flop 827 derived via the differentiating circuit is changed in accordance with the output of the hysteresis comparator 825. Namely, when the phase of the phase adjusting circuit 820 is changing between $b$ and $d$ in FIG. 10, the difference between the hold voltage $V_p$ of the peak hold circuit 824 and the envelope voltage $V_e$ of the envelope detection circuit 823 is not larger than $e_2$ ($V_p - V_3 \leq e_2$) and the output voltage of the hysteresis comparator 825 is at a positive level, so that a transistor 643 is conductive through a resistor 644. Thus, the output of the flip-flop 827 is divided by resistors 640 and 641 and at $V_1$. When the control system is not pulling or as the phase shifts from the range between $b$ and $d$ in FIG. 10 toward $a$ or $e$ by the influence of noise or the like, the output voltage of the hysteresis comparator 825 becomes a negative level and the transistor 642 is rendered nonconductive. Thus, the output of the flip-flop 827 is divided by the resistor 640 and the resistors 641 and 642 and at $V_2$. By selecting the resistors 640, 641 and 642 such that the relation of $V_1 < V_2$ is obtained, the gradient of the output signal of the signal generating circuit 827' is gentle when the input voltage to the integrator 828 is $V_1$ or when a proper tracking is being maintained, and the rate of change of phase of the phase adjusting circuit is lowered. When the input voltage to the integrator 828 is $V_2$ or when the control system is not pulling, that is, as the phase shifts from the range between $b$ and $d$ in FIG. 10 toward $a$ or $e$ by the influence of noise or the like, the gradient of the output signal of the signal generating circuit 827' is steepened so that the time required to reach a proper tracking condition is shortened. While the input voltage level to the integrator 828 of the signal generating circuit 827' is charged by the gradient modification circuit 645 in accordance with the output condition of the hysteresis comparator 825 in the above example, the gradient of the output of the signal generating circuit 827' may be changed in accordance with the output voltage of the envelope detection circuit 823 instead of the hysteresis comparator 825. Furthermore, the gradient of the output signal of the signal generating circuit 827' may be changed by changing the resistance of the integrator 828 of the signal generating circuit 827'.

In this manner, the gradient of the output signal of the signal generating circuit 827' is reduced when the envelope voltage is high while the gradient of the output signal of the signal generating circuit 827' is steepened when the envelope voltage is low so that the time required to reach a proper tracking condition is reduced and once the proper tracking is reached the rate of change of phase of the phase adjusting circuit 820 is lowered to prevent the increase of wow-flatter and the frequency of change is lowered to minimize the influence on the quality of reproduced image.

The output of the integration circuit 828 may be applied to the flip-flop 827 through a saturation detection circuit 829. With this arrangement, the extremities of the range of phase variation (positions A and B in FIG. 10) of the phase adjusting circuit 820 is detected by the saturation detection circuit 829 to forcibly invert the flip-flop 827. A specific circuit configuration thereof is shown in FIG. 12.

As described above, when the flip-flop 827 assumes the negative voltage level, the output of the integrator 828 is in the decreasing direction and the phase of the phase adjusting circuit 820 changes in the direction of ($b$) to ($a$) in FIG. 10. When it reaches the position A in FIG. 10 which is one of the extremities of the range of variation of the phase adjusting circuit 820, the phase adjusting circuit 820 stops the operation at that point.

According to the present embodiment, when the output of the integrator 828 is going to fall below a predetermined voltage $v_o$, the flip-flop 827 is forcibly inverted to the positive voltage level. That is, resistors 240, 241, 242 and 244, transistors 243 and 245 are provided such that when the output of the integrator 828 falls below the predetermined voltage $v_o$, the transistor 245 changes from a high level to a low level to supply a set signal to the flip-flop 827 to forcibly invert the same to the positive voltage level. Consequently, the output of the integrator 828 is changed to the increasing direction and the phase of the phase adjusting circuit 820 is changed in the direction of ($a$) to ($b$) in FIG. 10. As a result, it varies between ($b$) and ($d$). In the above explanation, it is assumed that the flip-flop 827 is initially at negative voltage level. Assuming now it is initially at positive voltage level, the output of the integrator 828 is in the increasing direction and the phase of the phase adjusting circuit 820 changes in the direction of ($a$) to ($b$) in FIG. 10. Therefore, it does not reach the extremities of the range of variation of the phase adjusting circuit 820 but varies between ($b$) and ($d$). Similarly, assuming that the flip-flop 827 is at the positive voltage level and the phase of the phase adjusting circuit 820 is changing in the direction of ($d$) to ($e$), and finally reaches the position B in FIG. 10 which is at the other extremity of the range of variation of the phase adjusting circuit 820, when the output voltage of the integrator 828 is going to exceed a the predetermined voltage $v_o$, the transistor 249 of the saturation detection circuit, which comprises the resistors 246, 247, 248 and the transistor 249, is changed from a high level to a low level to supply a reset signal to the flip-flop 827 to focibly invert the same from the positive voltage to the negative voltage. As a result, the phase of the phase adjusting circuit 820 changes in the direction of ($e$) to ($d$) in FIG. 10 and the finally changes between ($b$) and ($d$). If the flip-flop 827 is initially at negative voltage level, the phase changes from ($e$) to ($d$) and does not reaches B but varies between ($b$) and ($d$).

The predetermined voltages $v_o$ and $v_1$ may be set to the extremities of the range of variation (A and B in FIG. 10) of the phase adjusting circuit 820 by variable resistors 241 and 271 or they may be set to other appropriate values in association with the integration circuit 828 and the phase adjusting circuit 820.

While the saturation level of the integrator 828 is detected to invert the flip-flop 827 in the present embodiment, the saturation level may be detected by the phase adjusting circuit 820 to invert the flip-flop 827.

As described above, according to the present embodiment, when the signal generating circuit 827' which generates a tracking control signal in response to the output of the detection circuit 825 (and which comprises the flip-flop circuit 827 and the integrator 828) becomes saturated, the polarity of the signal generating circuit 827' is forcibly inverted to prevent the control system from stabilizing at the extremities of of the range of variation of the phase adjusting circuit.

Now, lets consider the situation where either of the extremities of the range of variation of the phase adjusting circuit 820 (A and B in FIG. 10) is near the peak. For example, when A in FIG. 10 is at slightly rightward of the peak point $c$ (shown by X in FIG. 13), and if the flip-flop 27 is at the negative voltage level and the phase is changing in the direction of $e$ to $d$, the flip-flop 827 is forcibly inverted to the positive voltage level at the point X by the set signal from the transistor 245, and the phase of the phase adjusting circuit 820 changes the direction from $d$ to $e$ in FIG. 13. At this time, the output voltage $V_p$ of the peak hold circuit 824 holds the voltage corresponding to the point X while the output voltage $V_2$ of the envelope detection circuit 823 decreases because the phase changes in the direction of $d$ to $e$ while the voltage difference between $V_p$ and $V_e$ falls below $e_2$ at $d'$, at which time the comparator 825 inverts its output to apply the negative pulse to the differentiating circuit 826 which in turn inverts the flip-flop 827 so that the phase again changes in the direction of $e$ to $d$. In this manner it changes between X and $d'$ and does not reach the peak point.

In the present embodiment, when the set signal is developed from the transistor 245 of the saturation detection circuit 829, the flip-flop 827 is forcibly inverted to the positive voltage level and the gate drive circuit 252 comprising a monostable multivibrator, for example, is triggered by the set signal to condition the gate circuit 250 for a predetermined period so as to prevent the output of the differentiating circuit 826 from being applied to the flip-flop 827. Thus, the negative pulse of the differentiating circuit 826 developed at $d'$ as stated above is not conveyed to the flip-flop 827 and the reinversion of the flip-flop 827 at d', which has been inverted by the set signal, does not occur. Consequently, the phase continues to change in the direction of d to e and after it varies between the phases f and h around the peak point g, which corresponds to the threshold voltage $e_2$. The period during which the gate 250 is conditioned may be set to be longer than the period required for the phase to change from X to d'.

When the other extremity of the range of variation of the phase adjusting circuit 820 is at a similar position to that described above, the same operation occurs. That is, when the reset signal is developed from the transistor 249 of the saturation detection circuit 829, the flip-flop 827 is forcibly inverted to the negative voltage level and the gate drive circuit 251 is triggered to condition the gate circuit 250 for a predetermined time period so as to prevent the phase from changing between the extremity of the changing range of the phase adjusting circuit 820 and a point slightly displaced therefrom and to assure that it shifts side to side around the peak point being the phase of the phase adjusting circuit. It is necessary, in this case, that the range of variation of the phase adjusting circuit 820 always includes at least one peak point.

In the embodiment of FIG. 8, because the control signal 803 is utilized, the entire tracking control system is phase controlled coarsely by the rotation phase signal of the rotary head the reproduction control signal and a fine phase adjustment is tracking controlled in accordance with the envelope voltage. Accordingly, the control system is stable and the change frequency can be readily set to a low value.

While the speed phase control of the capstan motor 809 is utilized in FIG. 8 as a drive control system for the capstan 814, the present invention is not limited to the particular embodiment but the electromagnetic brake may be utilized. Furthermore, the capstan 814 may be driven at a predetermined fixed speed and a so-called head motor servo system in which the head motor 808 is controlled by the output of the phase compare circuit 817 may be employed. In this case, considering the fluctuation of the image, the tracking control system must be constructed to insure low change frequency, and it will be effective to change the integration time constant in accordance with the envelope voltage.

While the peak hold circuit 824 is arranged in parallel with the envelope detection circuit 823 in the above embodiment, a series arrangement in which the output of the envelope detection circuit 823 is applied to the peak hold circuit 824 may be used. Furthermore, in FIG. 8, the phase adjusting circuit 820 may be inserted between the control signal amplifier 816 and the phase comparator 817.

In the comparator 825 described above, when there exists the envelope voltage variation of the reproduced signal which occurs while the rotary head (804 or 804') is scanning one of the recorded signal tracks 2 and the abrupt change of the envelope by voltage difference of the envelope voltages due to the difference of the characteristics of the rotary heads 804 and 804' or due to noises, and if the variation of the envelope voltage occurs near the threshold voltage $e_o$, the output voltage of the comparator 825 changes between positive and negative in response to the variation of the envelope voltage and the comparator 825 produces unstable variation in the output voltage when the input voltage is near the threshold voltage (point b in FIG. 10). This imparts an adverse affect to the control system.

To overcome this problem, the previous embodiment used the hysteresis comparator. Another approach is described below. Referring to FIG. 14, a gate circuit 441 is provided in order to ungate the output of the differentiation circuit for a predetermined period to prevent the influence of the variation of the envelope voltage. In FIG. 14, elements corresponding to like elements in FIG. 8 bear the same reference numerals and are not described in detail.

The operation of the circuit including the gate circuit 441 is as follows. The output of the comparator 825 is applied to the differentiating circuit 826 so that positive and negative pulses are generated for each inversion of the output of the comparator 825. The monostable multivibrator 440 is triggered only by the positive pulse output to produce a positive level output voltage for a predetermined period. The output voltage of the monostable multivibrator 440 in turn actuates the gate circuit 441 to maintain the output of the differentiating circuit 826 at a zero level. The differentiating circuit 826 produces the positive pulse when $V_e > V_p - e_o$, which corresponds to approximately the threshold value at the point b in FIG. 10. At this point of time the comparator 825 inverts to the positive level and the gate circuit 441 is actuated for the predetermined period by the positive pulse output of the differentiating circuit 826 so that the output of the differentiating circuit 826 is not conveyed to the signal generating circuit 827' for the predetermined period. Consequently, changing back of the phase of the phase adjusting circuit 82 toward the point A, which occurs due to the fact that the envelope voltage variation at the point b in FIG. 10 causes the inversion of the comparator 825 to the negative level can be prevented. The time period during which the gate circuit 441 is actuated is determined by the output of the monostable multivibrator 440 and it should be set to be shorter than a time required for the phase of the phase adjusting circuit 820 to reciprocate within the threshold value (between b and d in FIG. 10).

A similar gate circuit may be provided near the threshold voltage output (point d in FIG. 10). In this case, a monostable multivibrator 440' arranged in parallel with the monostable multivibrator 440 may be triggered by the negative pulse output of the differentiating circuit 826 to actuate the gate circuit 441.

By the provision of the gate circuit 441, it is assured that the phase of the phase adjusting circuit 820 reciprocates within the threshold value without being affected by the envelope voltage variation due to the wow-flutter of the tape transport of the VTR.

A second example of this approach is now explained with reference to FIG. 15, in which elements which are duplicates of elements in FIG. 8 bear the same reference numerals and are not explained.

The output of peak hold circuit 824 which is the same as that explained in FIG. 8 and the output of the envelope detection circuit 834, which is in the embodiment of FIG. 15 arranged in series, are applied to a differential circuit 525 to develop a difference signal therebetween. The differential circuit 525 produces an output which is proportional to the difference between the output $V_p$ of the peak hold circuit 824 and the output of the envelope detection circuit 823, i.e. $V_p - V_e$. The output of the differential circuit 525 is applied to an integration circuit 526, the output of which is applied to a comparator 527 and compared therein with a reference voltage E which is another input to the comparator 527. When the output of the integration circuit 526 is larger than the reverence voltage E, the comparator 527 produces a position voltage $E_1$ output while it produces a negative voltage $E_2$ output when the output of the integration circuit 526 is smaller than the reference voltage E. The output of the comparator 527 is applied to a signal generating circuit 528' which may comprise a flip-flop 528 and an integration circuit 529. When the output of the comparator 527 changes from the positive voltage $E_1$ to the negative voltage $E_2$, the flip-flop 528 is triggered so that the output thereof is inverted to positive voltage or negative voltage. The output of the flip-flop 528 is applied to the integration circuit 529 and integrated therein to produce increasing or decreasing signal depending on the polarity of the output voltage of the flip-flop 528, which signal is used to control the phase of the phase adjusting circuit 820, which may be a variable delay circuit comprising a conventional monostable multivibrator and being capable of changing the amount of shift in accordance with an externally applied voltage. The phase adjusting circuit 820 is triggered by the output of the magnetic head 819 for detecting the rotation phase of the rotary heads 804 and 804' and the shift amount thereof (phase) is determined by the output of the integration circuit 529. The range of phase change of the phase adjusting circuit 820 is set to be sufficiently wide so that it includes at least one maximum envelope position. A portion of the output of the comparator 527 is also applied to a discharge circuit 530 so that when the output of the comparator 527 changes from the positive voltage to the negative voltage, the voltages of the envelope detection circuit 823, the peak hold circuit 824 and the integration circuit 526 are discharged by the discharge circuit 530 to momentarily reset the outputs of those circuits to a predetermined level (e.g. zero level). At the start, at time $t = t_o$, as shown in FIGS. 16A through 16F, the output of the comparator 527 (shown in FIG. 16D) changes from the positive voltage to the negative voltage and the discharge circuit 530 is actuated to reset the output voltage of the envelope detection circuit 823 (shown by a solid line in FIG. (6A), the output voltage of the peak hold circuit 824 (shown by a dotted line in FIG. 16A) and the output of the integration circuit 526 (shown in FIG. 16C) to zero level. When the output phase of the phase adjusting circuit 820 determined by the output of the integration circuit 529 (shown in FIG. 16F) at that moment corresponds to the position (a) in FIG. 10, the output of the integration circuit 529 increases because the output of the flip-flop 528 (FIG. 16E) is at the positive voltage, and hence the phase of the phase adjusting circuit 820 increases. In accordance therewith, the envelope detection circuit 823 and the peak hold circuit 824 complete the reset period and the outputs thereof recover to the output level corresponding to the phase (a) of the phase adjusting circuit and they increase at the same rate as the phase increases. When the phase of the phase adjusting circuit changes past the position (b) in FIG. 10 and reaches the position (c) at which the envelope is maximum, the output of the envelope detection circuit 823 again decreases but the peak hold circuit 824 holds the maximum value. As a result, the differential circuit 525 (FIG. 16B) produces a negative differential output. Thus, the integration circuit 526 again starts to integrate the negative voltage and the negative integrated output increases with time. When the integrated output reaches the reference voltage E of the comparator 527, the output of the comparator 527 again changes from the positive voltage to the negative voltage and the discharge circuit thereby operates and then the output of the flip-flop 528 changes from the positive voltage to the negative voltage. Accordingly, the integration circuit 529 changes in the decreasing direction and the phase of the phase adjusting circuit 820 changes in the decreasing direction. A similar operation takes place and thus the phase of the phase adjusting circuit 820 reciprocates around the point at which the envelope is maximum, or between b and d in FIG. 10 so that an optimum tracking is always maintained. In this manner, by properly setting the maximum envelope voltage, the gain of the differential circuit and the time constant of the integration circuit, a satisfactory tracking servo system can be obtained. The tracking servo of the present system is characterized in that it is relatively insensitive to the variation of the envelope voltage due to wow-flutter and noise because the integration of the difference between the envelope detection voltage and the peak hold voltage is used as the reference.

The above explanation is for a normal operation. At the start, if the output of the comparator 527 is such that the phase of the phase adjusting circuit 820 changes from the positive voltage to the negative voltage at the position a in FIG. 10 and if the flip-flop 528 is changing in the direction of the positive voltage to the negative voltage, the output of the integraion circuit 529 decreases, and the amount of phase shift of the phase adjusting circuit 820 may decrease past a point at which the envelope voltage is minimum and stabilizes at one extremity A of the range of phase change for the phase adjusting circuit 820. In order to avoid such abnormal condition, a saturation level detection circuit 539 for detecting the saturation (less than the predetermined voltage $v_o$) of the output of the signal generating circuit 528' and a discharge period setting circuit 540 for controlling discharge period of the discharge circuit 530 by the output of the saturation level detection circuit 539 are provided. The saturation level detection circuit 539 detects when the output of the signal generating circuit 528', that is, the output of the integration circuit 529 in FIG. 15 exceeds the predetermined voltage $V_1$ or falls below $V_2$ to change the polarity of change of the output of the signal generating circuit 528' and triggers the discharge period setting circuit 540 which may comprises a monostable multivibrator. The discharge period setting circuit 540 applies a discharge signal to the discharge circuit 530 for a period from the triggering of the monostable multivibrator to the reset to a stable state in order to hold the outputs of the envelope detection circuit 823, the peak hold circuit 824 and the integraion circuit 526 at a zero level. Thus, when the phase of the phase adjusting circuit 820 reaches near the point A in FIG. 10, the saturation level detection circuit 539 is operated to invert the output polarity of the flip-flop 528 of the signal generating circuit 528' from the negative voltage to the positive voltage so that the output of the integration circuit 529 again starts to increase and the phase of the phase adjusting circuit 820 changes away from the point A. However, since the envelope detection circuit 823, the peak hold circuit 824 and the integration circuit 526 are being reset to zero level during the period for which the discharge period setting circuit 540 is operated by the saturation level detection circuit 539, no output appears at the integration circuit 526 and the comparator 527 is kept at the positive voltage so that the output of the integration circuit 529 continues to increase and the phase of the phase adjusting circuit 820 continues to change toward a. As the discharge period terminates at a time point when the phase changed past the point at which the envelope voltage is minimum, the envelope detection circuit 823 and the peak hold circuit 824 immediately assume the corresponding envelope voltage and the both outputs increase in the same level. Consequently, the output of the integration circuit 526 is zero after the termination of the discharge period and the integrated output first appears after the phase of the phase adjusting circuit has changed past $b$ and the peak position $c$. The subsequent operation is identical to that in normal operation described above.

FIG. 17 shows examples of the saturation level detection circuit 539 and the discharge period setting circuit 540. When the output of the integration circuit 529 reaches a positive saturation level, a base potential of the transistor 544 rises to render the same conductive resulting in a low level output voltage. This output voltage resets the flip-flop 528 to cause it to assume the negative level, and triggers and monostable multivibrator 554 through a diode 551. The monostable multivibrator 554 applies a discharge signal to the discharge circuit 530 for a predetermined period (trigger period of the monostable multivibrator). When the output of the integration circuit 529 reaches a negative saturation level, a collector output of a transistor 550 assumes a low level to apply a set signal to the flip-flop 528 for forcibly inverting the same to the positive voltage. It also triggers the monostable multivibrator 554 through the diode 552 to apply the discharge signal to the discharge circuit 530. The detection level of the saturation voltage may be set by adjusting variable resistors 542 and 546. The discharge period may be set by adjusting the time constant of quasi-stable period of the monostable multivibrator 554.

While the discharge circuit 530 in FIG. 15 is operated when the output of the comparator 527 changes from the positive voltage $E_1$ to the negative voltage $E_2$, it may be operated in response to the change of the output of the flip-flop. Furthermore, while the envelope detection circuit 823, the peak hold circuit 824 and the integration circuit 826 are discharged by the discharge circuit in the above embodiment, the envelope detection circuit is not necessarily discharged and the peak hold circuit 824 may be arranged to produce the same voltage as the envelope detection circuit 823. The envelope detection circuit and the peak hold circuit may be arranged in parallel rather than in series.

In the embodiments of FIGS. 1 and 8, the reproduced envelope signal is utilized for the entire period as a continuous signal. Taking the compatibility into consideration, the envelope voltage reproduced only over a specified section of the record track (e.g. one section at the center of the tape) may be used to constitute the tracking control system.

A particular embodiment to accomplish this is shown in FIG. 18, in which elements which are identical to those in FIG. 8 bear the same reference numerals and are not explained in detail. The signal which is envelope detected by the envelope detection circuit 823 is sampled by the sample hold circuit 841 by a sampling pulse which is produced by delaying a phase of a rotation phase signal detected by the magnet piece 818 and the magnet head 819 by a predetermined time period and which is applied to the sample hold circuit 840, and the sampled signal is held until the next sampling period. The output of the sample hold circuit 841 has a ripple resulting from the sample hold circuit eliminated by a filter 842 and then supplied to the peak hold circuit 824, which can hold the maximum amplitude of a portion of the envelope detected signal over a relatively long period and may include the decrease of the hold voltage due to the discharge. It may be a conventional envelope detection circuit as shown in FIG. 4 in which the charging time constant is set properly taking the abrupt change of the envelope voltage due to noise or the like and the discharging time constant is set to be longer than the charging time constant. The output of the peak hold circuit 824 and the output of the filter 842 are applied to the comparator 825, which as shown in FIG. 5 produces the positive voltage $V_1$ when the output voltage $V_p$ of the peak hold circuit 824 and the output voltage $V_e$ of the filter 842 satisfy the relation $V_e > V_p - e_o$ and produces the negative voltage $V_2$ when $V_e \leqq V_p - e_o$. Namely, the comparator 825 determines whether the voltage difference between the output voltage $V_p$ of the peak hold circuit 824 and the output voltage $V_e$ of the filter 842 is smaller than the properly set threshold voltage $e_o$ ($V_p - V_e < e_o$) or not smaller ($V_{p-Ve} \geqq e_o$), and produces the positive output voltage $V_1$ when the difference voltage in smaller and produces the negative output voltage when it is not smaller. Thus, the comparator can determine whether the difference between $V_p$ and $V_e$ exceeds the threshold voltage $e_o$ or not. The subsequent operation is the same as that in FIG. 8. In this manner, the phase of the phase adjusting circuit 820 varies between $b$ and $d$ in FIG. 10 and the output voltage of the envelope detection circuit 823 changes between the voltages shown by 51 and 52 in FIG. 10. Thus, by properly setting the threshold $e_2$ a satisfactory tracking condition can be maintained. As a result, in accordance with the reproduced signal level at a predetermined position on the record track, a relative position of the rotary head to the magnetic tape is automatically changed to continuously and automatically attain a satisfactory tracking.

What is claimed is:

1. A rotary head type magnetic recording and reproducing system comprising:
    means for transporting a magnetic tape having an information signal thereon in record tracks which are oblique to the longitudinal length of the tape,
    means for rotating a rotary head for scanning said record tracks on said magnetic tape,
    means connected to said rotary head for providing a read-out envelope signal representing said information signal recorded on said tape,
    a peak hold circuit for holding a signal representing the maximum amplitude of said read-out envelope signal,
    an envelope detection circuit for detecting the envelope of said read-out envelope signal,
    detection means coupled to said peak hold circuit and said envelope detection circuit for producing a first level output voltage signal when the difference between the output voltage of said peak hold circuit and the output voltage of said envelope detection circuit is less than a predermined threshold and producing a second level output voltage signal when the difference between the output voltage of said peak hold circuit and the output voltage of said envelope detection circuit is greater than or equal to said threshold voltage,
    control signal producing means responsive to the output of said detection means for producing a first control signal, and control means responsive to said first control signal for controlling the movement of either said tape transport means or said rotary head rotating means to control the relative positional relationship between a trace of rotation of said rotary head and said record tracks on said magnetic tape.

2. A rotary head type magnetic recording and reproducing system according to claim 1, wherein the output of said envelope detection circuit represents the relative position of said rotary head with respect to said record track.

3. A rotary head type magnetic recording and reproducing circuit according to claim 1, wherein said detection means includes a comparator having a hysteresis characteristic.

4. A rotary head type magnetic recording and reproducing system according to claim 1, further including means for changing a response characteristic of said control signal producing means in accordance with the output magnitude of said envelope detection circuit.

5. A rotary head type magnetic recording and reproducing system according to claim 1, wherein said control signal producing means includes a differentiating circuit for differentiating the output of said detection means, a flip-flop adapted to be triggered by one of the positive or negative polarity outputs of said differentiating circuit, and an integration circuit for integrating the output of said flip-flop circuit.

6. A rotary head type magnetic recording and reproducing system according to claim 5, wherein the output level of said flip-flop to be applied to said integration circuit is changed in accordance with the output magnitude of said envelope detection circuit.

7. A rotary head type magnetic recording and reproducing system according to claim 5, wherein a time constant of said integration circuit is changed in accordance with the output magnitude of said envelope detection circuit.

8. A rotary head type magnetic recording and reproducing system according to claim 1, wherein the application of the output of said detection means to said control signal producing means is prevented for a given period after the occurrence of the change of the output of said detection means.

9. A rotary head type magnetic recording and reproducing system according to claim 8, further including a gate circuit inserted between said detection means and said control signal producing means, said gate circuit being controlled by an output of a delay circuit which is triggered by the output of said detection means.

10. A rotary head type magnetic recording and reproducing system according to claim 1, wherein said detection means includes a differential amplifier for producing a difference signal between the outputs of said peak hold circuit and said envelope detection circuit, an integration circuit for integrating the output of said differential amplifier, and comparing means for comparing the output of said integration circuit with a predetermined threshold to produce detection signals of a first level when the output level of said integration circuit is less than the predetermined threshold and a second level when the output level of said integration circuit is greater than or equal to said predetermined threshold, and further including means responsive to the change of the output of said comparing means for causing the output of said integration circuit and said peak hold circuit to be discharged.

11. A rotary head type magnetic recording and reproducing system according to claim 1, wherein said peak hold circuit receives the output of said envelope detection circuit as an input thereto.

12. A rotary head type magnetic recording and reproducing system according to claim 11, further including rotation phase detection means for detecting the rotation phase of said rotary head, and means for applying the output of said envelope detection circuit to said peak hold circuit through a series circuit of a sample and hold circuit and a filter, said sample and hold circuit being controlled by a signal related to the output of said rotation phase detection means, the output of said peak hold circuit and the output of said filter being applied to said detection means.

13. A rotary head type magnetic recording and reproducing system according to claim 1, further comprising:
rotation phase detection means for detecting a rotation phase of said rotary head and producing a phase signal,
reproducing means for reproducing a second control signal recorded on said magnetic tape at a given phase position with respect to said record tracks,
a phase adjusting circuit responsive to the output of said rotation detection means for controllably shifting the phase of said phase signal in accordance with said first control signal, and
a phase comparator for receiving as a first input signal the output of said rotation phase detection means through said phase adjusting circuit and as a second input signal the output of said reproducing means and detecting a phase difference between said two input signals, the output of said phase comparator being applied to said control means.

14. A rotary head type magnetic recording and reproducing system according to claim 13, wherein said control signal producing means includes a differentiating circuit for differentiating the output of said detection means, a flip-flop circuit adapted to be triggered by one of the positive or negative polarity outputs of said differentiating circuit, and an integration circuit for integrating the output of said flip-flop circuit, said flip-flop also being triggered by an output from a saturation detector provided when said saturation detector detects the output of said integration circuit reaching a predetermined level.

15. A rotary head type magnetic recording and reproducing system according to claim 13, further including a gate circuit for blocking the application of the output of said detection means to said control signal producing means for a given period of time when the output level of said control signal producing means reaches a predetermined level.

16. A rotary head type magnetic recording and reproducing system according to claim 13, further comprising saturation detection means for detecting a predetermined output level of said phase adjusting circuit and changing the polarity of the output of said control signal producing means when said predetermined output level is detected.

17. A rotary head type magnetic recording and reproducing system according to claim 1, further including:
rotation phase detection means for detecting a rotation phase of said rotary head and producing a phase signal,
reproducing means for reproducing a second control signal recorded on said magnetic tape at a given phase position with respect to said record tracks, a phase adjusting circuit responsive to the output of said reproducing means for shifting the phase of said second control signal in accordance with said first control signal, and a phase comparator for receiving as a first input signal the output of said reproducing means through said phase adjusting circuit and as a second input signal the output of said rotation phase detection means and detecting the phase difference between said two input signals, the output of said phase comparator being applied to said control means.

* * * * *